April 12, 1949. C. L. EKSERGIAN 2,467,356
SUPPORT FOR BRAKE MECHANISMS ON EQUALIZERS
Filed June 29, 1945
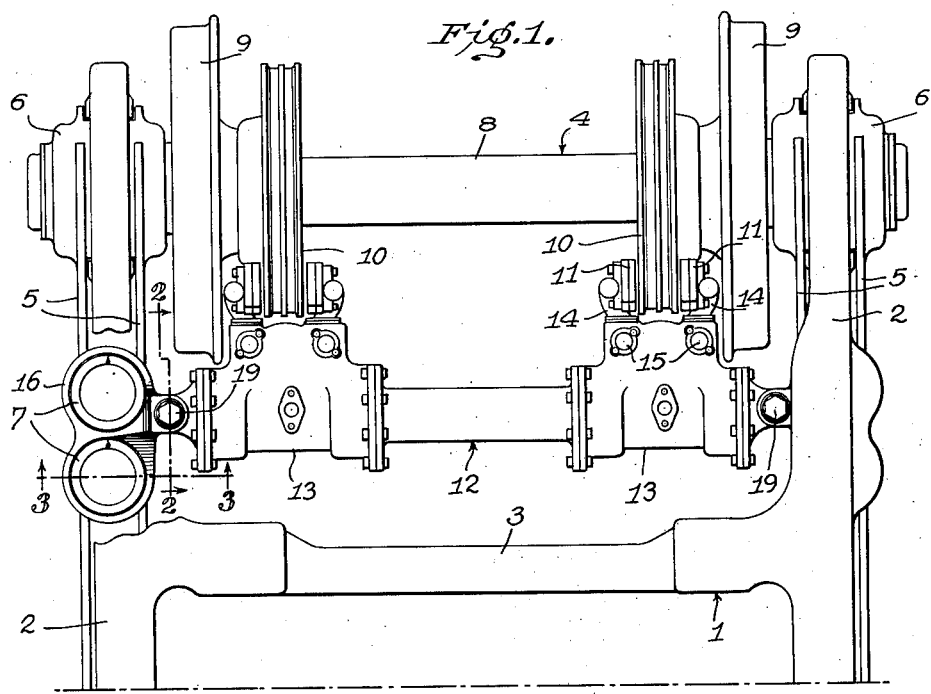
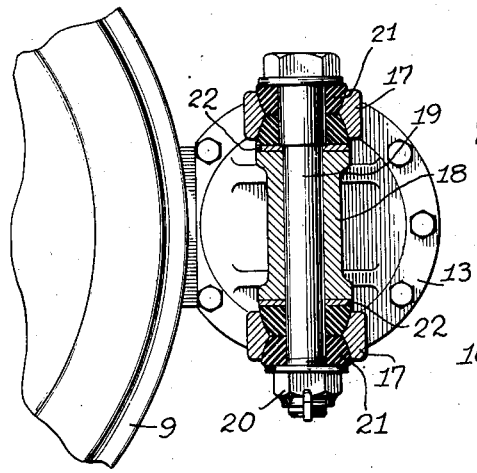
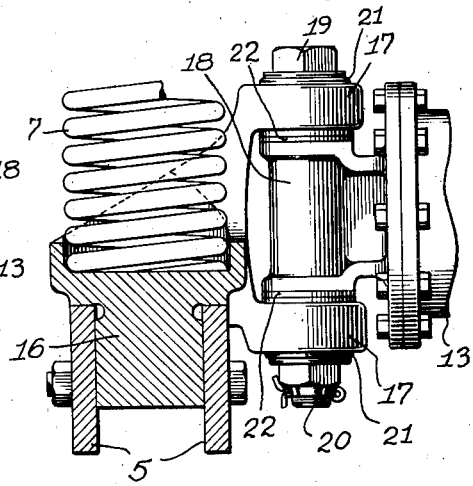
Carolus L. Eksergian
INVENTOR
BY
Donald B Waite
ATTORNEY Patented Apr. 12, 1949

2,467,356

UNITED STATES PATENT OFFICE 2,467,356

SUPPORT FOR BRAKE MECHANISMS ON EQUALIZERS

Carolus L. Eksergian, Detroit, Mich., assignor to The Budd Company, Philadelphia, Pa., a corporation of Pennsylvania Application June 29, 1945, Serial No. 602,212

4 Claims. (Cl. 188—205)

The invention relates to a brake mechanism and more particularly to the support of such mechanism from a vehicle, such as a railway truck.

It is an object of the invention to simplify the support of the brake mechanism for such vehicles to facilitate its manufacture and the assembly or disassembly with the vehicle.

It is a further object of the invention to support the non-rotary parts of the brake mechanism wholly on the equalizers of the truck and to do this in such manner as to facilitate the assembly and disassembly of the brake mechanism with the equalizers, and further to prevent lateral tilting of the equalizers under the load, such as the braking torque, yet permit the relative movement of the equalizers without unduly straining the parts.

To attain these objects, the brake mechanism, including the non-rotary brake elements or shoes and their actuating means is carried by a transversely extending support member connected by flexible joint structures to the equalizers, such joint structures being preferably offset inwardly of the plane of the respective equalizers and also preferably substantially vertically extended to prevent appreciable tilting of the equalizers under braking torque. At the same time, the joints have a certain amount of yieldability to permit the relative movement of the equalizers without imposing undue strain on the parts.

Other and further objects and advantages and the manner in which they are attained will become apparent from the following detailed description when read in connection with the drawings forming a part of this specification.

In the drawings:

Fig. 1 is a plan view of one-half of a railway truck to which the invention has been shown applied;

Figs. 2 and 3 are detail sectional views on an enlarged scale taken substantially along the lines 2—2 and 3—3, respectively, of Fig. 1 showing the detail of the joint structure between equalizer and brake support.

In the embodiment of the invention selected for illustration, 1 designates a usual form of truck frame having side members 2 and transoms, as 3. The frame is spring-supported from the wheel and axle assemblies, as 4, by the usual equalizers 5 resting at their ends on top of the respective axle boxes 6 adjacent the ends of a wheel and axle assembly, and springs, as 7, interposed between the frame and equalizers in well known manner.

The wheel and axle assembly 4 comprises, in addition to the journal boxes 6, an axle 8 journalled therein and wheels 9 secured to the axle. The rotary elements of the brake mechanism are shown as comprising brake discs 10, one secured to rotate with each wheel.

Non-rotary brake elements, such as the arcuate segmental shoes 11, 11 are operatively associated with the opposite braking faces of each disc. These shoes and their actuating means are carried by a transversely extending support member designated generally by numeral 12. The shoes and their actuating means may comprise a cylinder housing unit 13 associated with each disc and forming a part of the support member 12. Each cylinder housing unit comprises brake cylinder actuators for actuating brake levers 14, 14, pivoted at 15, 15 in the housing unit and pivotally carrying the shoes 11, 11, all as more fully described and claimed in Patent No. 2,413,614 for "Brake mechanism," issued December 31, 1946.

This specific manner of carrying the shoes and their actuating means forms no part of the invention and further description thereof is believed unnecessary. It will be obvious that the brake shoes may be supported from the transverse support member 12 in many different ways and be actuated by different actuators. The manner in which the brake support member 12 is supported at its ends by the equalizers which form the sole support therefor through joint structures which carry all loading on the brake support to the equalizers forms the real gist of the invention.

Since the brake support member 12 extends between the equalizers in the region adjacent the wheels of the adjacent wheel and axle assembly 4, it is convenient to utilize the spring seats, as 16, rigidly tied to the equalizers at this location, as the parts through which the member 12 is joined to the equalizers. Each spring seat forms in effect, by reason of its fitted and bolted connection to the adjacent equalizer, an integral part of said equalizer. While the equalizers have been shown as parallel bar equalizers it will be understood that the invention is equally applicable to single bar equalizers.

Since the joint structures at the opposite ends of the support member 12 are the same, but one such structure need be described.

By reference to Figs. 1 and 3 it will be seen that the spring seat 16 is extended laterally to form substantially vertically arranged spaced perforated lugs or bearing elements 17 and that the adjacent end of the support member 12 is formed with a vertically extending perforated end part 18 received loosely between the spaced lugs 17. To secure these parts together a bolt 19 is passed through the perforations in the lugs 17 and part 18 and secured in place by a nut 20.

To allow for the necessary relative movements between the equalizers at the opposite sides of the truck, two part tapered rubber bushings 21, their taper filling corresponding opposed tapered faces on the lugs 17, are inserted between the bolt 19 and the respective lugs 17, the ends of these bushings bearing on the adjacent ends of the part 18 and the bolt head and nut, respectively. To permit slight rotary movement of the part 18 with respect to the lugs 17 without acting on the rubber, a bearing washer 22 may be inserted between end face of part 18 and the adjacent bushing 21.

With this arrangement of joint, it will be seen that the parts can be readily manufactured and the brake support may be readily mounted or demounted as a unit from the equalizers. The yieldability of the joint permits the slight relative longitudinal movement of the equalizers and also the slight relative tilting thereof in a vertical plane without imposing undue strain on the jointed parts. At the same time, the generally vertical arrangement of the joint prevents material tilting of the equalizers laterally under the heavy loading produced by the braking torque. The joint further makes it possible to use the brake member as a spacing member between the opposed equalizers.

While a specific embodiment of the invention has been herein described, it will be understood that changes and modifications may be made by those skilled in the art without departing from the main features of the invention and such changes and modifications are intended to be covered by the appended claims.

What is claimed is:

1. In a brake arrangement, a wheel and axle assembly, equalizers supported from the opposite ends of said assembly, and a brake support extending between said equalizers and connected thereto at its opposite ends for sole support thereby through generally vertically extended flexible joint structures laterally offset from the plane of the respective equalizers, said joint structures being of such substantial vertical extent as to enable them to transmit the braking torque in entirety between said support and said equalizers and at the same time prevent appreciable lateral tilting of the equalizers under the braking loads.

2. In a brake arrangement, a wheel and axle assembly, equalizers supported from the opposite ends of said assembly, and a brake support extending between the equalizers and connected thereto at its opposite ends for sole support thereby through generally vertically extended flexible joint structures offset inwardly from the plane of the respective equalizers, each of said joint structures comprising spaced bearings on one of the associated equalizer and brake support end and a preforated part on the other extending between said bearings, and a securing member extending through said spaced bearings and perforated part, the vertical extent of said joint structures being such as to prevent appreciable lateral tilting of the equalizers under braking loads.

3. In a brake arrangement, a wheel and axle assembly, equalizers supported from the opposite ends of said assembly, and a brake support extending between the equalizers and connected thereto at its opposite ends for sole support thereby through flexible joint structures, each of said joint structures comprising spaced perforated lugs on one of the associated equalizer and brake support end and a perforated part on the other extending between said lugs, a securing member extending through said spaced lugs and part, and resilient means disposed between said member and one of said lugs and part.

4. In a brake arrangement, a wheel and axle assembly, equalizers supported from the opposite ends of said assembly, and a brake support extending between the equalizers and connected thereto at its opposite ends through flexible joint structures, each of said joint structures comprising spaced perforated lugs on the equalizer and a perforated part on the associated end of the brake support extending between said lugs, a bolt extending through said spaced lugs and said part and rubber bushings inserted between said bolt and said lugs and bearing on the ends of said part when the parts are in assembled relation.

CAROLUS L. EKSERGIAN.

REFERENCES CITED

The following references are of record in the file of this patent:

UNITED STATES PATENTS

| Number | Name | Date |
|---|---|---|
| Re. 22,558 | Nystrom et al. | Oct. 24, 1944 |
| 2,365,692 | Frede et al. | Dec. 26, 1944 |
| 2,399,071 | Tack et al. | Apr. 23, 1946 |